United States Patent [19]
Jakubiec et al.

[11] Patent Number: 6,129,400
[45] Date of Patent: Oct. 10, 2000

[54] DOUBLE TIERED CENTER CONSOLE

[75] Inventors: Steven M. Jakubiec, Bloomfield; David A. Bargiel, Troy; Richard Rogala, L'ance, all of Mich.

[73] Assignee: DaimlerChrysler Corporation, Auburn Hills, Mich.

[21] Appl. No.: 09/216,514

[22] Filed: Dec. 18, 1998

[51] Int. Cl.⁷ .................................................. B60R 7/04
[52] U.S. Cl. ...................... 296/37.14; 220/521; 220/826; 224/275; 224/539; 224/926; 248/311.2
[58] Field of Search ............................... 296/24.1, 37.8, 296/37.14; 224/275, 539, 566, 926; 220/500, 505, 521, 819, 826; 248/311.2

[56] References Cited

U.S. PATENT DOCUMENTS

| | | | |
|---|---|---|---|
| D. 141,295 | 5/1945 | Wright | D15/6 |
| D. 207,902 | 6/1967 | Bray | D14/6 |
| D. 252,540 | 8/1979 | Murphy | D3/40 |
| D. 253,946 | 1/1980 | Fought | D12/155 |
| D. 267,444 | 1/1983 | Ruxton | D3/40 |
| D. 297,287 | 8/1988 | Lopez | D6/356 |
| D. 317,674 | 6/1991 | Smith | D3/40 |
| D. 356,693 | 3/1995 | Meier | D6/356 |
| D. 357,129 | 4/1995 | Tiramami | D6/336 |
| D. 359,266 | 6/1995 | Karp et al. | D12/419 |
| D. 375,480 | 11/1996 | Smith | D12/419 |
| 2,759,529 | 8/1956 | Hagadorn | 155/190 |
| 2,907,378 | 10/1959 | Barecki | 155/191 |
| 3,321,237 | 5/1967 | Gangell | 296/63 |
| 3,336,077 | 8/1967 | Radke et al. | 297/193 |
| 3,356,409 | 12/1967 | Belsky et al. | 296/24 |
| 3,482,418 | 12/1969 | Moore | 62/457 |
| 4,668,010 | 5/1987 | Fujiwara | 297/150 |
| 4,681,367 | 7/1987 | Timmers | 297/232 |
| 4,708,386 | 11/1987 | Moore et al. | 296/37.8 |
| 4,809,897 | 3/1989 | Wright, Jr. | 224/282 |
| 4,821,931 | 4/1989 | Johnson | 224/42.42 |
| 4,883,317 | 11/1989 | Davenport | 297/193 |
| 4,928,865 | 5/1990 | Lorence et al. | 224/275 |
| 4,998,770 | 3/1991 | Shimizu et al. | 296/37.8 |
| 5,046,433 | 9/1991 | Kramer et al. | 108/44 |
| 5,085,481 | 2/1992 | Fluharty et al. | 296/37.8 |
| 5,096,249 | 3/1992 | Hines | 296/37.15 |
| 5,106,143 | 4/1992 | Soeters | 296/37.8 |
| 5,131,716 | 7/1992 | Kwasnik et al. | 297/194 |
| 5,338,081 | 8/1994 | Young et al. | 296/37.14 |
| 5,397,160 | 3/1995 | Landry | 296/37.8 |
| 5,524,957 | 6/1996 | Gibriano | 297/144 |
| 5,529,376 | 6/1996 | Jovan et al. | 297/257 |
| 5,622,404 | 4/1997 | Menne | 297/188.1 |
| 5,683,137 | 11/1997 | McDonald et al. | 297/217.3 |
| 5,704,684 | 1/1998 | Dukatz et al. | 297/238 |
| 5,720,513 | 2/1998 | Raukauskas | 297/188.1 |
| 5,779,302 | 7/1998 | Geier et al. | 297/188.17 |
| 5,800,011 | 9/1998 | Spykerman | 297/188.19 |
| 5,863,089 | 1/1999 | Ignarra et al. | 296/37.8 |

FOREIGN PATENT DOCUMENTS

| | | | |
|---|---|---|---|
| 40-5139199 | 6/1993 | Japan | 296/37.8 |

*Primary Examiner*—D. Glenn Dayoan
*Assistant Examiner*—Paul Chenevert
*Attorney, Agent, or Firm*—Roland A. Fuller, III

[57] ABSTRACT

A center console member for a vehicle seating assembly is provided. The console member includes a first compartment member, a second compartment member and a lid member. The first compartment member is formed in the shape of a container having an open bottom and a partially open top. The second compartment member is formed in the shape of a container having an open top. The second compartment member is pivotably coupled to the first compartment member and overlies the partially open top when placed in a closed position. The lid member is coupled to the second compartment member and overlies the open top when placed in a closed position. Additional storage cavities may be incorporated into the console member, including cavities in the top portion of the first compartment member or in the front or rear sidewalls of the first compartment member.

18 Claims, 3 Drawing Sheets

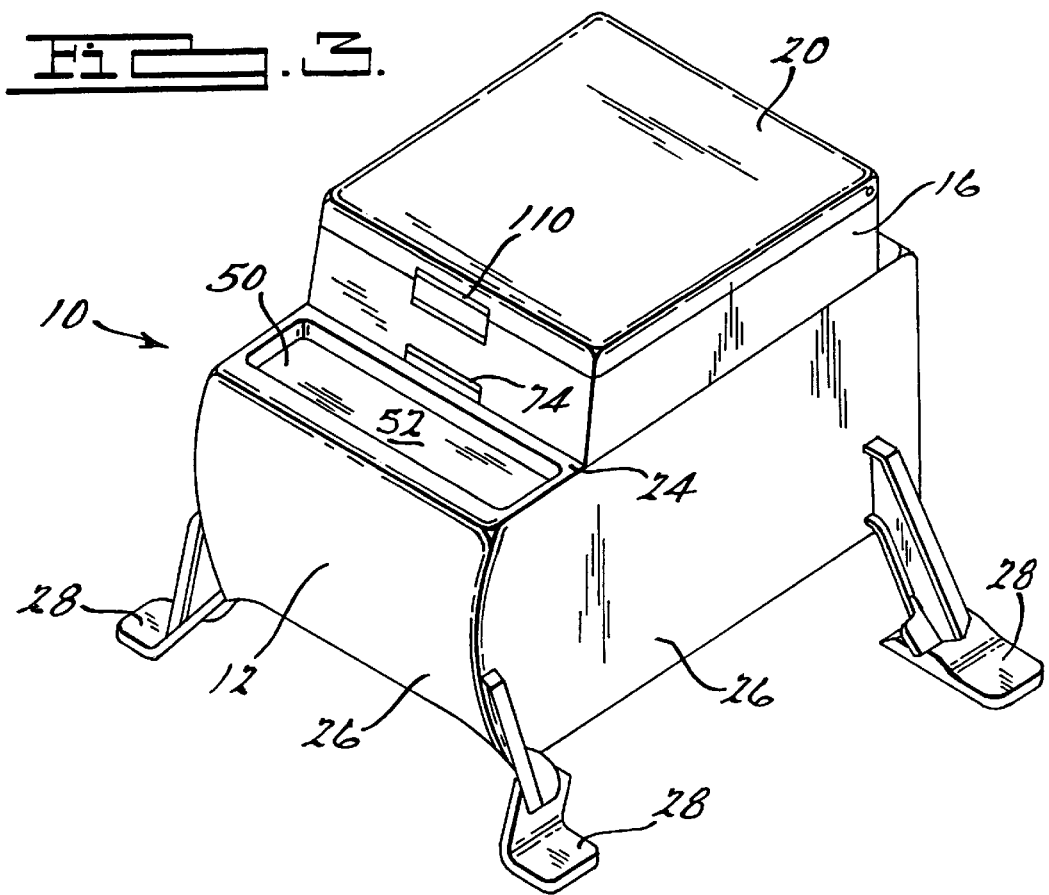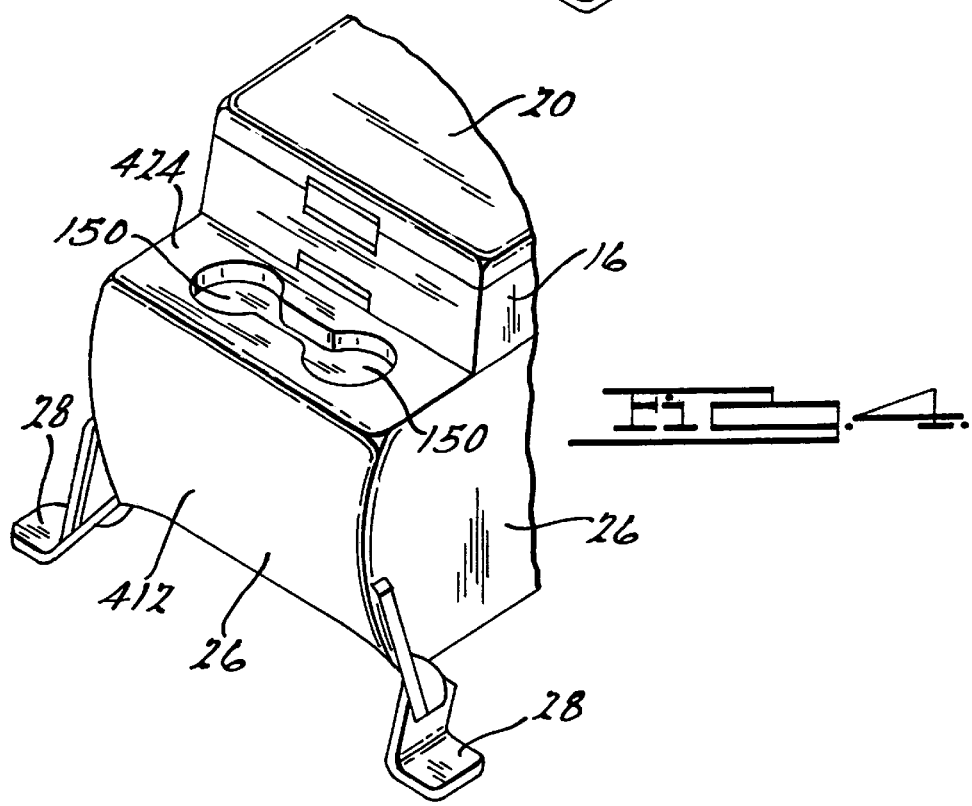

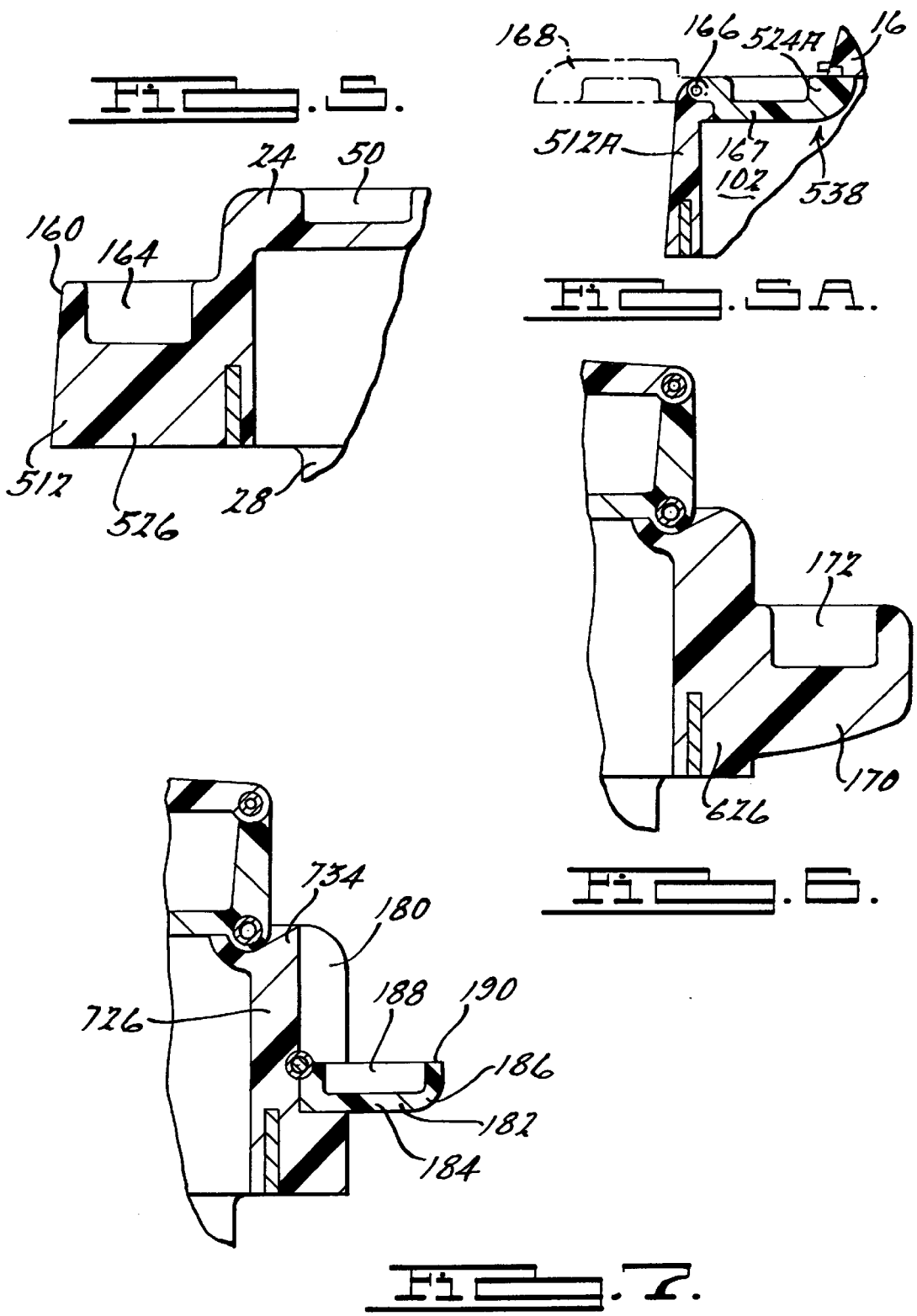

DOUBLE TIERED CENTER CONSOLE

BACKGROUND OF THE INVENTION

1. Technical Field

The present invention relates generally to a center console for use in a vehicle and more particularly to a center console having a pair of storage compartments which can be easily accessed by the vehicle operator.

2. Discussion

With increased vehicle usage, traffic congestion, urban sprawl and the general acceptance of longer commutes between home and the workplace, the time which vehicle owners are spending in their vehicles is on the increase. Observing this, many vehicle owners attempt to use their vehicle as either a second office for conducting business affairs or as an extension of their home to relax while commuting. As such, vehicle occupants are tending to transport an increasing amount of gear, such as cellular phones, dictation machines, compact discs and cassette tapes. As such, there is a general need and desire to make the interior of the vehicle as comfortable and convenient as possible.

One manner of improving the convenience and comfort of the vehicle interior is to include storage compartments within the center console of the vehicle which would facilitate the storage of such gear. Recognizing this problem, several console designs had been developed over the years which include one or more storage compartments. Frequently, these consoles did not blend well with the vehicle interior, were not robust in their design and did not offer storage areas which could be conveniently accessed by the vehicle driver while operating the vehicle.

Consequently, there remains a need in the art for a center console having a pair of storage compartments which can be easily accessed by the vehicle operator.

SUMMARY OF THE INVENTION

It is therefore one object of the present invention to provide an improved center console for a bench-type seating system.

It is a more specific object of the present invention to provide a center console which provides the front seated vehicle occupants with convenient storage.

It is another object of the present invention to provide a center console which is robust in design but yet aesthetically appealing.

The center console member for a vehicle seating assembly of the present invention includes a first compartment member, a second compartment member and a lid member. The first compartment member is formed in the shape of a container having an open bottom and a partially open top. The second compartment member is formed in the shape of a container having an open top. The second compartment member is pivotably coupled to the first compartment member and overlies the partially open top when placed in a closed position. The lid member is coupled to the second compartment member and overlies the open top when placed in a closed position. Additional storage cavities may be incorporated into the console member, including cavities in the top portion of the first compartment member or in the front or rear sidewalls of the first compartment member.

Additional advantages and features of the present invention will become apparent from the subsequent description and the appended claims, taken in conjunction with the accompanying drawings.

BRIEF DESCRIPTION OF THE DRAWINGS

FIG. 3 is a partial perspective view of the front of the double-tiered center console member shown in FIG. 1;

FIG. 4 is a partial perspective view of the front of the double tiered center console member similar to that of FIG. 3A but showing an alternate configuration;

FIG. 5 is a partial sectional view of the front of the double tiered center console member showing a second alternate configuration;

FIG. 5A is a partial sectional view of the front of the double tiered center console member showing a third alternate configuration;

FIG. 6 is a partial sectional view of an alternate configuration of the rear side of the double-tiered center console member shown in FIG. 1;

FIG. 7 is a partial sectional view of a second alternate configuration of the rear side of the double-tiered center console member shown in FIG. 1;

DETAILED DESCRIPTION OF THE PREFERRED EMBODIMENT

Figure 1:
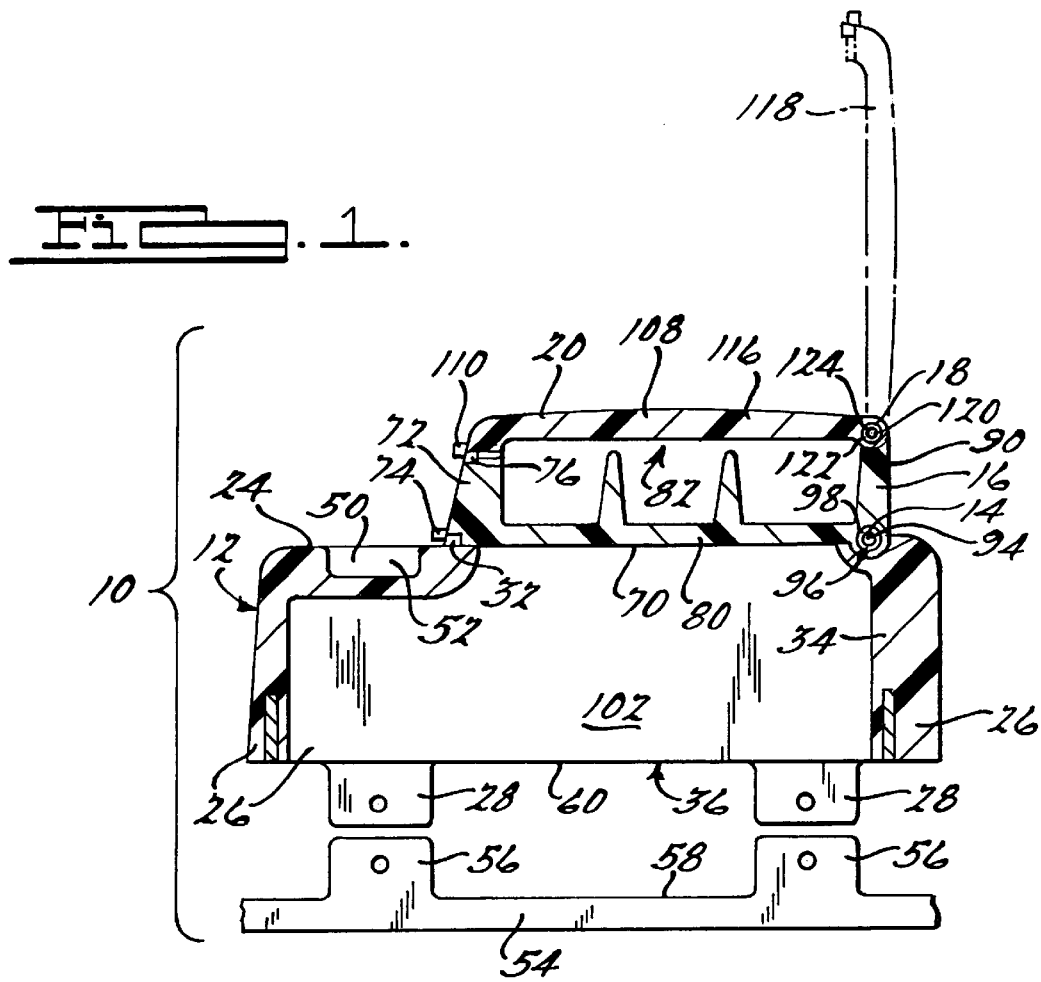
FIG. 1 is sectional view of a double-tiered center console member constructed in accordance with the teachings of the preferred embodiment of the present invention.
Figure 2:
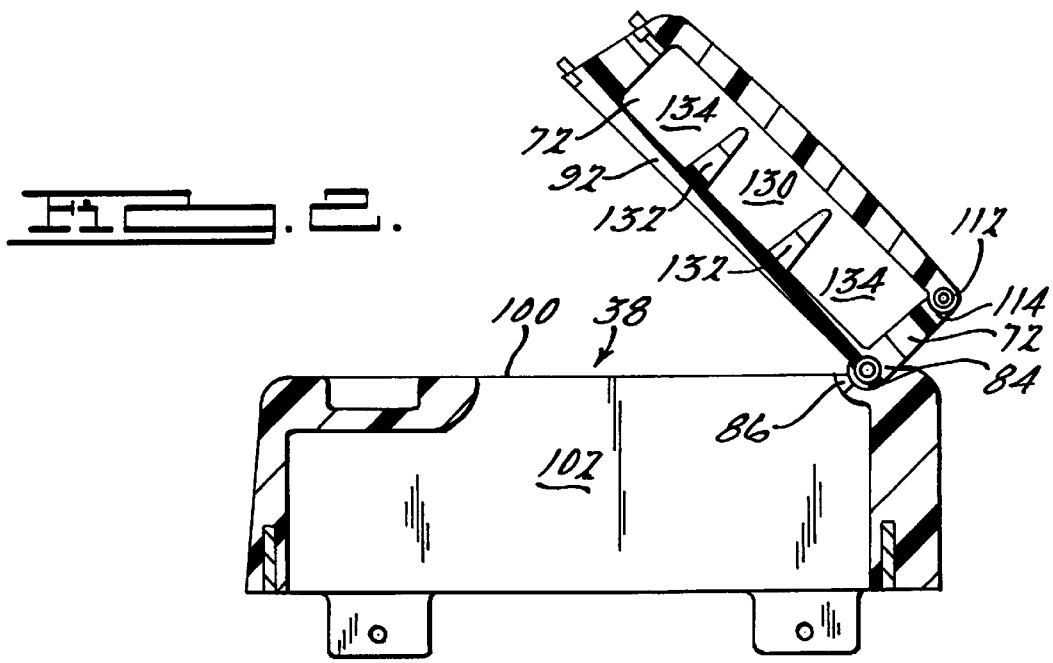
FIG. 2 is a partial sectional view of the double-tiered center console member shown in FIG. 1 which shows the accessing of a first storage area.

With particular reference to FIGS. 1 and 2, a double-tiered center console member constructed in accordance with the teachings of the present invention is generally indicated by reference numeral 10. Console member 10 is shown to include a first compartment member 12, a first hinge means 14, a second compartment member 16, a second hinge means 18 and a lid member 20.

First compartment member 12 includes an upper surface 24, a plurality of substantially vertical sidewalls 26, an attaching means 28 and a first latch means 32. Vertical sidewalls 26 and upper surface 24 are coupled together so as to form a container-like structure 34 with an open bottom 36 and a partially open top 38. Upper surface 24 is coupled to the front, left and right sidewalls 26 so as to increase the rigidity of structure 34. As shown in FIG. 3, a laterally elongated cavity 50 may be incorporated into upper surface thereby providing an uncovered exterior storage area 52 which is easily accessible to the front seated vehicle occupants. Preferably, structure 34 is unitarily molded from a composite polypropylene material having a composition which consists of approximately 15% of an appropriate filler material, such as talc or glass.

First compartment member 12 includes attaching means 28 for coupling console 10 to the vehicle 54. Attaching means 28 may be fastened to or molded into structure 34 and is preferably configured so as to allow console member 10 to be mounted to the front seat inboard risers 56. Configuration of first compartment member 12 in this manner enables the vehicle floor 58 to enclose the bottom surface 60 of structure 34. Alternatively, structure 34 can be formed with an integral bottom surface (not shown).

Second compartment member 16 includes a lower surface 70, a plurality of substantially vertical sidewalls 72, a first release means 74 and a second latch means 76. Vertical sidewalls 72 and lower surface 70 are coupled together so as to form a container-like structure 80 with an open top 82. Structure 80 is configured to overlie and cover the partially open top 38 of first compartment member 12. Structure 80 is preferably unitarily molded from a composite polypropylene material having a composition which consists of approximately 15% of an appropriate filler material, such as talc or glass.

Second compartment member 16 is pivotally connected at its lower rear side 84 to the upper rear side 86 of first compartment member 12 through first hinge means 14 which enables second compartment member 16 to swing upwards and pivot to the rear of vehicle 54, thereby allowing second compartment member 16 to be pivotally moved between a substantially flat closed position 90 and a substantially vertical open position 92. First hinge means 14 is preferably a hinge pin 94 which extends through the pin apertures 96 and 98 located in first and second compartment members, respectively. Connecting first compartment member 12 to second compartment member 16 in this manner provides an inexpensive yet extremely robust connection that improves the overall appearance of center console member 10 by concealing first hinge means 14.

When placed in closed position 90, second compartment member 16 is supported on lower surface 70 by a top edge 100 of structure 34. Supporting second compartment member 16 in this robust manner thereby provides sufficient strength. When second compartment member 16 is placed in the open position 92, unrestricted access is provided to a storage area 102 defined by vertical sidewalls 26, vehicle floor 58 and upper surface 24. First release means 74 is operable for selectively engaging and releasing first latch means 32 when second compartment member 16 is placed in closed position 90. When first release means 74 and first latch means 32 are engaged, second compartment member 16 is prevented from pivoting in the direction of open position 92, thereby securely storing any items which have been placed in storage area 102.

Lid member 20 includes cover 108 and second release means 110. Cover 108 is configured to cover and overlie the open top 82 of second compartment member 16 and is preferably unitarily molded from a composite polypropylene material having a composition which consists of approximately 15% of an appropriate filler material, such as talc or glass. Lid member 20 is pivotally connected at its rear side 112 to the upper rear side 114 of second compartment member 16 through second hinge means 18 which enables lid member 20 to swing upwards and pivot to the rear of vehicle 54, thereby allowing lid member 20 to be pivotally moved between a substantially flat closed position 116 and a substantially vertical open position 118 as shown in phantom in FIG. 1. Second hinge means 18 is preferably a hinge pin 120 which extends through the pin apertures 122 and 124 located in second compartment member and lid member, respectively. Connecting second compartment member 16 to lid member 20 in this manner provides an inexpensive yet extremely robust connection that improves the overall appearance of center console member 10 by concealing second hinge means 18.

When lid member 20 is placed in the open position 118, unrestricted access is provided to a storage area 130 defined by sidewalls 72 and lower surface 70. As shown, structure 80 may be formed with one or more substantially vertical dividers 132 which segregate storage area 130 into a plurality of smaller storage cavities 134. Second release means 110 is operable for selectively engaging and releasing second latch means 76 when lid member 20 is placed in closed position 116. When second release means 110 and second latch means 76 are engaged, lid member 20 is prevented from pivoting in the direction of open position 118, thereby securely storing any items which have been placed in storage area 130.

FIGS. 4 though 7 illustrate several alternate embodiments of the present invention. In FIG. 4, a pair of side-by-side substantially circular cavities 150 are formed into upper surface 424 to support beverage containers (not shown) of the front seated vehicle passengers. In FIG. 5, the embodiment is similar to that shown in FIG. 3 in that laterally elongated cavity 50 is incorporated into upper surface 24. Additionally, however, this embodiment also includes a projection 160 from front sidewall 526 having a pair of side-by-side substantially circular cavities 164 which hold beverage containers (not shown) of front seated vehicle passengers. FIG. 5A illustrates an embodiment which is similar to the embodiment shown in FIGS. 1 and 2 but includes a hinge means 166 for pivotably connecting upper surface 524A to first compartment member 512A. As such, first compartment member 512A has a fully open top 538. Coupling upper surface 524A to first compartment member 512A permits upper surface 524A to be pivotally moved between a generally flat closed position 167 in which upper surface 524A overlies a first portion of open top 538 and an open position 168 which allows full access to storage area 102. Second compartment member 16 is sized to cover the remaining portion of open top 538 which is not covered by upper surface 524A when placed in closed position 167.

Similar features may be incorporated into the rear sidewall 26 of structure 34. For example, as shown in FIG. 6, a projection 170 is incorporated into rear sidewall 626. Projection 170 includes a pair of side-by-side substantially circular cavities 172 for holding the beverage containers (not shown) of rear seated passengers. Another alternative configuration is shown in FIG. 7. In this configuration, a recess 180 is formed into the rear sidewall 726 of structure 734 to accommodate the mounting of a door 182. Door 182 is pivotally coupled to structure 734, allowing door to be pivotally moved between a substantially vertical closed position (not shown) and a substantially horizontal open position 184. The rear surface 186 of door 182 is configured so as to blend in with the exterior features of rear sidewall 726 and thereby conceal recess 180 when door 182 is placed in the closed position. A pair of side-by-side substantially circular openings 188 are incorporated into the front surface 190 of door 182 and are operable for holding beverages of the rear seated vehicle occupants when door 182 is placed in open position 184.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A center console member for a bench seat assembly comprising:

a first compartment member having an upper surface and a plurality of substantially vertical sidewalls coupled together in the form of a container having a substantially open top and a substantially open bottom;

a first hinge mechanism coupled to a rearward side of said first compartment member;

a second compartment member having a bottom surface and a plurality of substantially vertical sidewalls coupled together in the form of a container having an open top, a rearward side of said second compartment member coupled to said first hinge mechanism thereby pivotally connecting said second compartment member to said first compartment member and permitting said second compartment member to be pivotally moved between a generally flat position in which said second compartment member overlies said open top and is supported by a top surface of at least two of said substantially vertical sidewalls of said first compartment member and a generally upright position in which said second compartment member is in a substantially vertical position;

a second hinge mechanism coupled to said rearward side of said second compartment member;

a lid member coupled to said second hinge member at a rearward side thereby pivotally connecting said lid member to said second compartment member and permitting said lid member to be pivotally moved between a generally flat position in which said lid member overlies said open top of said second compartment member and is supported by a top surface of at least two of said substantially vertical sidewalls of said second compartment member and a generally upright position in which said lid member is in a substantially vertical position; and attaching means adapted for securing said center console member to a front seat inboard riser.

2. The center console member for a bench seat assembly of claim 1 wherein said first compartment member is molded from a composite polypropylene material.

3. The center console member for a bench seat assembly of claim 2 wherein said composite polypropylene material includes approximately 15% of a filler material selected from a group of filler materials consisting of talc and glass.

4. The center console member for a bench seat assembly of claim 1 wherein said second compartment member is molded from a composite polypropylene material.

5. The center console member for a bench seat assembly of claim 4 wherein said composite polypropylene material includes approximately 15% of a filler material selected from a group of filler materials consisting of talc and glass.

6. The center console member for a bench seat assembly of claim 1 wherein said lid member is molded from a composite polypropylene material.

7. The center console member for a bench seat assembly of claim 6 wherein said composite polypropylene material includes approximately 15% of a filler material selected from a group of filler materials consisting of talc and glass.

8. The center console member for a bench seat assembly of claim 1 wherein said first hinge means is a hinge pin.

9. The center console member for a bench seat assembly of claim 1 wherein said second hinge means is a hinge pin.

10. The center console member for a bench seat assembly of claim 1 wherein said first compartment member further includes at least one projection coupled to one of said sidewalls of said first compartment member, said at least one projection having at least one substantially circular cavity for supporting a beverage container.

11. The center console member for a bench seat assembly of claim 10 wherein said at least one projection is coupled to a front sidewall of said first compartment member.

12. The center console member for a bench seat assembly of claim 10 wherein said at least one projection is coupled to a rear sidewall of said first compartment structure.

13. The center console member for a bench seat assembly of claim 1 wherein said upper surface includes at least one recessed cavity.

14. The center console member for a bench seat assembly of claim 13 wherein said at least one recessed cavity is elongated laterally.

15. The center console member for a bench seat assembly of claim 13 wherein said at least one recessed cavity is substantially circular and operable for supporting a beverage container.

16. The center console member for a bench seat assembly of claim 1 further including a first latch means and a first release means, said first latch means operably coupled to one of said first compartment member and said second compartment member and said first release means operably coupled to the other of said first compartment member and said second compartment member, said first latch means and said first release means operable for selectively coupling or uncoupling said first and second compartment members.

17. The center console member for a bench seat assembly of claim 1 further including a second latch means and a second release means, said second latch means operably coupled to one of said second compartment member and said lid member and said second release means operably coupled to the other of said second compartment member and said lid member, said second latch means and said second release means operable for selectively coupling or uncoupling said second compartment member and said lid member.

18. A center console member for a seat assembly comprising:

a first compartment member having a plurality of substantially vertical sidewalls coupled together in the form of a container having an open top and a substantially open bottom;

a first hinge mechanism coupled to a rearward side of said first compartment member;

a second compartment member having a bottom surface and a plurality of substantially vertical sidewalls coupled together in the form of a container having an open top, a rearward side of said second compartment member coupled to said first hinge mechanism thereby pivotally connecting said second compartment member to said first compartment member and permitting said second compartment member to be pivotally moved between a generally flat position in which said second compartment member overlies a first portion of said open top and is supported by a top surface of at least two of said substantially vertical sidewalls of said first compartment member and a generally upright position in which said second compartment member is in a substantially vertical position;

a second hinge mechanism coupled to said rearward side of said second compartment member;

a lid member coupled to said second hinge member at a rearward side thereby pivotally connecting said lid member to said second compartment member and permitting said lid member to be pivotally moved between a generally flat position in which said lid member overlies said open top of said second compartment member and is supported by a top surface of at least two of said substantially vertical sidewalls of said second compartment member and a generally upright position in which said lid member is in a substantially vertical position;

a third hinge mechanism coupled to a frontward side of said first compartment member;

a second lid member coupled at a frontward side to said third hinge mechanism thereby pivotally connecting said second lid member to said first compartment member and permitting said second lid member to be pivotally moved between a generally flat position in which said second lid member overlies a second portion of said open top of said first compartment member and an open position; and attaching means adapted for securing said center console member to a front seat inboard riser.

* * * * *